United States Patent [19]

Seitz

[11] 3,865,731
[45] Feb. 11, 1975

[54] FILTER SKIMMING DEVICE

[75] Inventor: Lamont J. Seitz, Huntington Beach, Calif.

[73] Assignee: Baxter Laboratories, Inc., Morton Grove, Ill.

[22] Filed: Dec. 21, 1973

[21] Appl. No.: 427,198

[52] U.S. Cl............... 210/359, 128/234, 210/446, 210/DIG. 23
[51] Int. Cl............................................. B01d 33/00
[58] Field of Search....... 23/230 B; 210/65, 83, 282, 210/350, 446, 451, 455, 359, DIG. 23, DIG. 24; 128/218 M, 218 P, 220, 234, 237

[56] References Cited
UNITED STATES PATENTS

| 407,934 | 7/1889 | Kirkwood | 128/234 |
|---|---|---|---|
| 443,083 | 12/1890 | Bartsch | 128/234 |
| 2,841,145 | 7/1958 | Epps | 128/218 M |
| 3,121,685 | 2/1964 | Hazell | 210/451 X |
| 3,348,546 | 10/1967 | Roberts et al | 128/218 M |
| 3,481,477 | 12/1969 | Farr | 210/DIG. 23 |
| 3,586,064 | 6/1971 | Brown et al. | 210/DIG. 23 |
| 3,661,265 | 5/1972 | Greenspan | 210/DIG. 23 |
| 3,693,804 | 9/1972 | Grover | 210/DIG. 24 |
| 3,799,342 | 3/1974 | Greenspan | 210/DIG. 23 |
| 3,802,843 | 4/1974 | Kim | 23/230 B X |

Primary Examiner—Charles N. Hart
Assistant Examiner—Robert H. Spitzer
Attorney, Agent, or Firm—Scott J. Meyer; Louis Altman

[57] ABSTRACT

A filter skimming device comprising an elongated plunger assembly adapted for telescopic insertion in a test tube. The plunger assembly has an elongated plunger tube, a filter element, an elongated tubular insert for collection of filtered fluid, and a molded-in channel in said tubular insert for carrying said filtered fluid from said filter to the interior of said insert.

3 Claims, 8 Drawing Figures

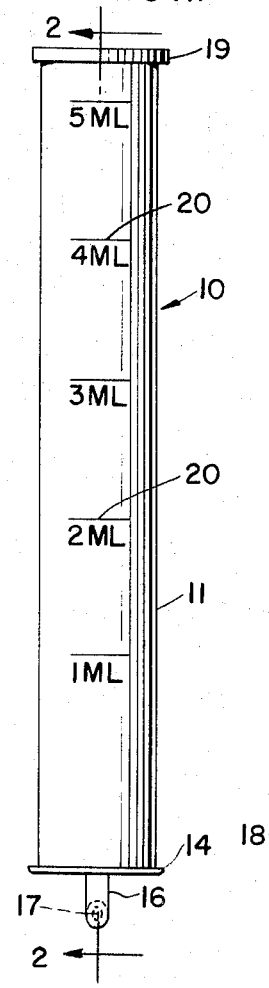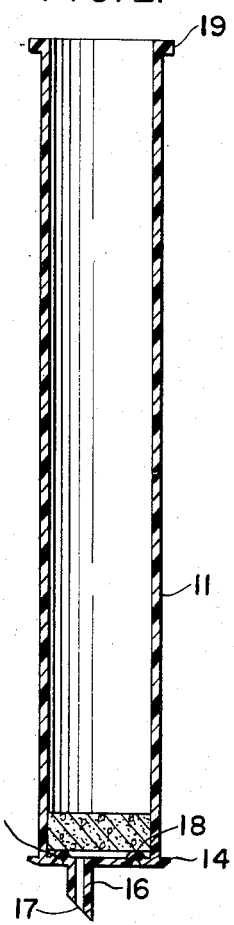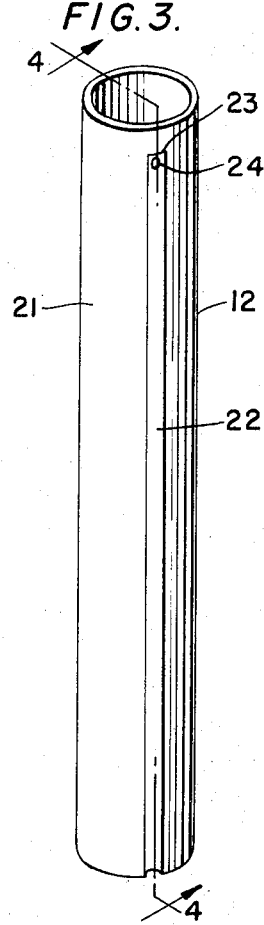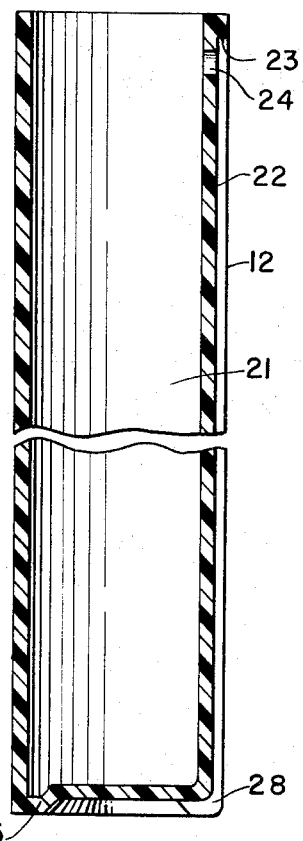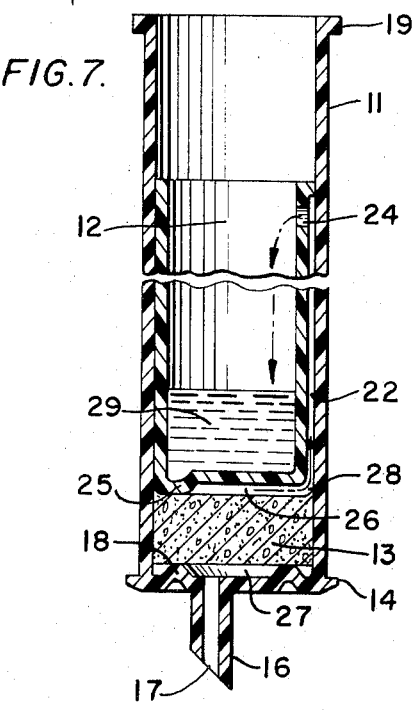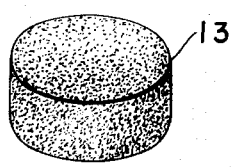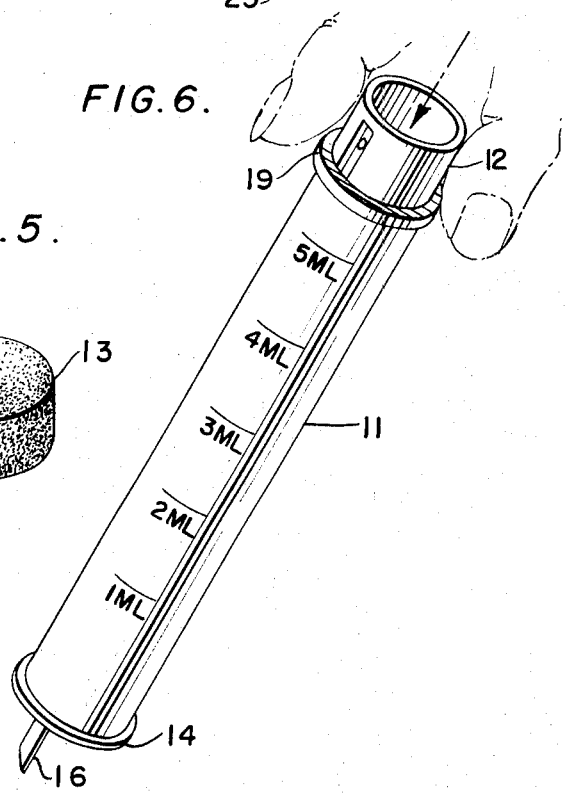

FILTER SKIMMING DEVICE

This invention relates to filter skimming method and device and, more particularly, to an improved method and device for the separation of blood serum or plasma from suspended cells and other particulate matter.

The separation of serum or plasma from centrifuged, clotted or whole blood specimens is a common clinical procedure. Various filter skimming devices have been adapted for such use. These devices are conventionally provided in the form of two telescoping tubes in which the outer tube is an initial blood collection test tube and the inner tube is a plunger tube which serves as a pressure or vacuum filter and collects the supernatant liquid as the plunger tube is depressed into the outer test tube. The plunger tube is provided with a filter at the bottom to occlude fibrin strands and other particulate matter from the supernatant liquid during the skimming of the supernatant blood serum or plasma from the centrifuged cells.

Illustrative of the foregoing filter skimming devices are those such as described in U.S. Pat. Nos. 3,355,098; 3,481,471; 3,512,940; 3,661,265; and 3,693,804.

It is an object of the present invention to provide an improved filter skimming method and device.

It is another object of this invention to provide a novel filter skimming method and device for improved separation of blood serum or plasma from suspended fibrin strands and other particulate matter.

It is still another object of this invention to provide a conveniently accessible test tube size filter skimming device comprising a filter skimming plunger assembly which is adapted to be telescopically inserted in a blood collection test tube whereby the specimen is filtered and collected within an inner tube of said plunger assembly.

These and other objects will be apparent to the person skilled in the art after reading the specification and claims hereof.

Briefly stated, the filter skimming device of this invention comprises an elongated plunger assembly adapted to be telescopically inserted in a test tube, said assembly comprising an elongated outer plunger tube, an elongated tubular insert and a cylindrical filter element disposed therebetween. The elongated outer plunger tube has a peripheral rim at the bottom for slidable sealing engagement of the inner walls of a test tube, a small bore probe at the bottom for allowing entrance of fluid specimen and an inner annular projection at the bottom upon which said filter element is seated. The elongated tubular insert is shorter than the outer plunger tube and is adapted to be inserted in snug relationship therewith. The tubular insert has a channel in its outer wall extending substantially throughout its entire length whereby a tubelike capillary space is formed between the outer wall of the insert and the inner wall of the plunger tube. Said tubular insert has an annular projection at the bottom for seating on said filter element.

While the specification concludes with claims particularly pointing out and distinctly claiming the subject matter regarded as forming the present invention, it is believed that the invention will be better understood from the following exemplary description taken in connection with the accompanying drawings in which:

FIG. 1 is a front elevational view of the elongated outer plunger tube of the filter skimming device.

FIG. 2 is an elevational view of the elongated outer plunger tube in cross-section taken along the lines 2—2 of FIG. 1 with the filter element placed therein.

FIG. 3 is a perspective view of the elongated tubular insert of the filter skimming device.

FIG. 4 is an elevational view of the elongated tubular insert in cross-section taken along the lines 4—4 of FIG. 3.

FIG. 5 is a perspective view of the filter element for placement in the outer plunger tube.

FIG. 6 is a perspective view showing insertion of the tubular insert into the outer plunger tube for assembly of the filter skimming device.

FIG. 7 is a side elevational view of the assembled filter skimming device in cross-section.

Figure 8:
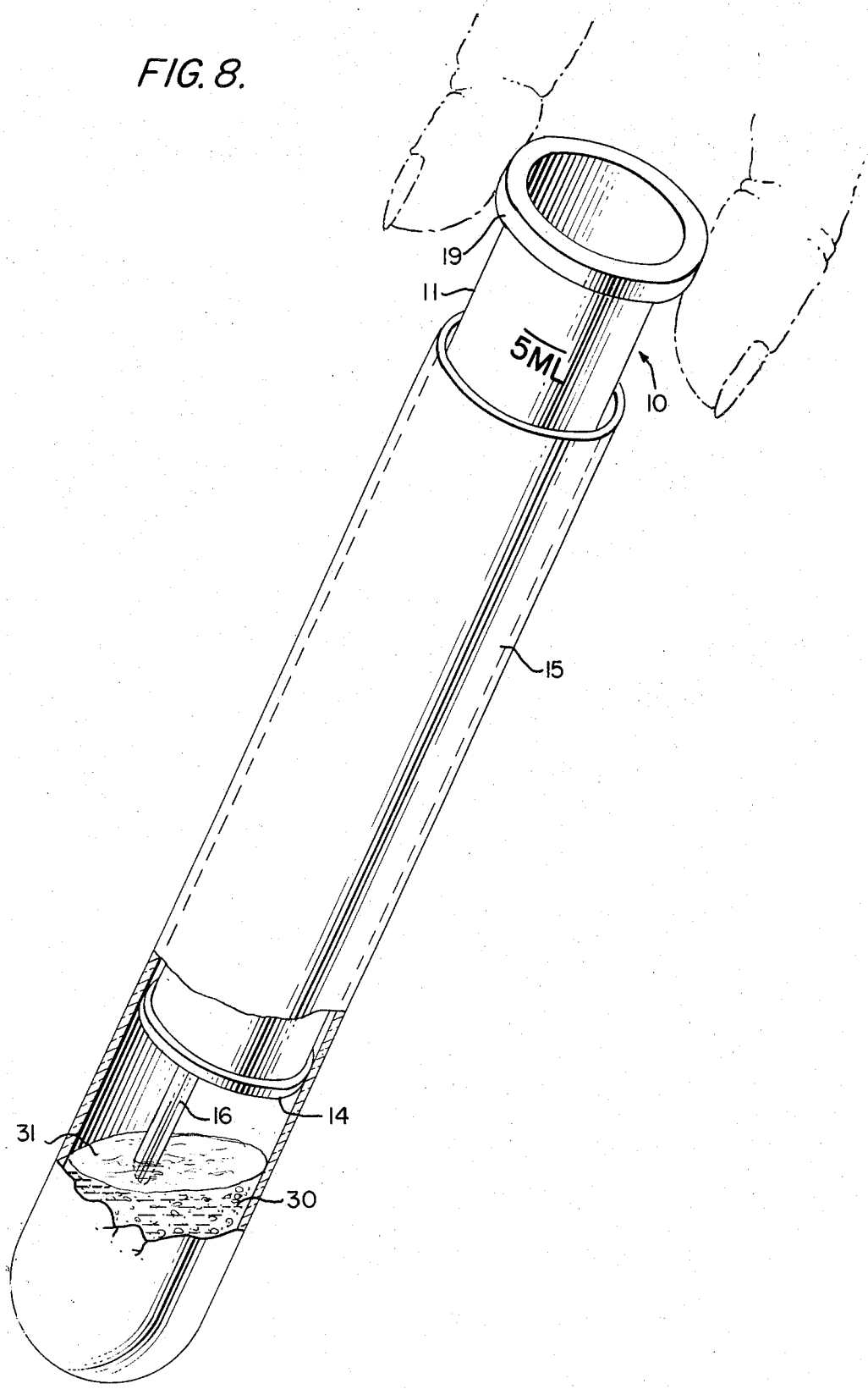
FIG. 8 is a perspective view showing the filter skimming device in operation.

Referring now to the drawings, the filter skimming device is indicated generally by reference numeral 10 and comprises elongated outer plunger tube 11, elongated tubular insert 12 and filter element 13.

Plunger tube 11 has a lower peripheral rim 14 which is adapted for slidable sealing engagement of the inner walls of test tube 15, and a probe 16 having a small bore opening 17 which extends downwardly and is preferably offset from the center of the bottom. Probe 16 preferably has a beveled edge such as, for example, a 45° angle at opening 17.

Plunger tube 11 has an annular projection 18 which forms a ridge on the inner bottom of said plunger tube.

Plunger tube 11 optionally has a peripheral flange 19 at the top which facilitates finger gripping and graduations 20 which facilitate measurement of the filtered fluid specimen but these features are not essential to the filter skimming device and method of the invention.

Elongated tubular insert 12 is somewhat shorter in length than outer plunger tube 11, as can best be seen from FIG. 7, and is adapted to be inserted in snug relationship therewith, as can best be seen from FIG. 6. Tubular insert 12 has a channel 22 in its outer wall 21 extending substantially throughout its entire length. In this embodiment, channel 22 is semi-circular in cross-section but it can have other configurations such as, for example, square, rectangular or triangular.

Channel 22 preferably terminates at wall 23. In such embodiment, there is provided a small bore opening 24 in channel 22 and transverse thereto. This opening leads to the interior of tubular insert 12. An advantage of terminating channel 22 at wall 23 is that the wall prevents spurting of filtered fluid out of the top of the channel and the plunger assembly while the plunger assembly is being depressed into the sample test tube.

Tubular insert 12 has annular projection 25 which forms a ridge at the outer bottom of said insert. Annular projection 25 terminates at the end of channel 22, whereby it forms opening 28 for passage of fluid into said channel.

In assembly, as can best be seen from FIG. 7, filter element 13 is positioned in plunger tube 11 at its bottom and seated on annular projection 18. Tubular insert 12 is then positioned in plunger tube 11 with its annular projection 25 being seated on top of filter element 13. Annular projections 18 and 25 thereby cooperate to form cavity 26 at the top and cavity 27 at the bottom of filter element 13. The lower cavity 27 allows the intake of fluid specimen through probe 16 to be evenly dispersed over the major portion of the bottom surface of filter element 13. The upper cavity 26 allows for uniform collection of the fluid specimen filtered by filter element 13. Opening 28 allows fluid flow from upper cavity 26 through channel 22 to opening 24 and final collection of supernatant fluid 29 in tubular insert 12 after its exit through opening 24.

Plunger tube 11, being slightly longer than tubular insert 12, is adapted for insertion of a stopper in its top. Use of a stopper in the present device is particularly desirable in the performance of blood gas analysis.

Filter element 13 is generally cylindrical or disk shaped and can be fabricated of various suitable filter materials such as glass-wool, asbestos, or synthetic plastic fibers, for example, compacted polypropylene or other such polyolefin fibers; porous ceramic or other such inert inorganic filtering materials, for example, sintered glass and diatomaceous silica; porous plastic substances such as polyurethane elastomeric foam and porous polyethylene. The pore size of the filter element preferably is such as will effectively filter all fibrin strands from a blood sample.

The filter skimming device of this invention is preferably made of a relatively clear material such as a relatively transparent plastic so that the operator can determine whether any cells are being passed through the filter. The apparatus can be conveniently fabricated of polyolefin plastic, for example, polyethylene and polypropylene and other such plastic materials.

In operation of the device and in practicing the method of the invention, as can best be seen from FIG. 7 and FIG. 8, the operator will grasp the end of plunger tube 11, with the assistance of flange 19, and depress the plunger tube in test tube 15 until probe 16 reaches through the top surface of the fluid specimen 30. Due to the slidable sealing engagement of rim 14 with the inner walls of the test tube, pressure will be created which forces the serum or plasma into lower cavity and thence through filter element 13. The filtered supernatant liquid 29 which collects in upper cavity 26 will be carried through opening 28 and will then be forced upward in channel 22. After reaching the top of tubular insert 12, the filtered fluid will pass through opening 24 and then be collected within the tubular insert. Plunger tube 11 can be depressed in the fluid specimen to the extent desired and generally so that probe 16 continuously extends into the supernatant fluid specimen as the fluid is being forced through the filter and until it finally reaches the surface of the cells packed at the bottom of the test tube. Rotation of plunger tube 11 having an offset probe 16 will ensure collecting supernatant liquid trapped in any fibrin strands 31. Plunger tube 11 may then be withdrawn either partially or completely from test tube 15 as desired. So long as the level of the filtered fluid collected in tubular insert 12 is below opening 24 no fluid will be drawn back through the filter as plunger tube 11 is withdrawn. The operator may observe the flow of filtered fluid through channel 22 which is visible through the wall of plunger tube 11. If the operator inadvertently despresses plunger tube 11 too far into test tube 15 whereby probe 16 reaches well into the cell pack, cells passing through filter 13 will be visible in channel 22 before they exit through opening 24 and become undesirably mixed with the filtered fluid collected in tubular insert 12. Partial withdrawal of plunger tube 11 from test tube 15 will draw back fluid and cells in channel 22 and thereby prevent contamination of the already filtered fluid in tubular insert 12.

As will be apparent from the foregoing, the present invention has various unique advantages over filter skimming devices of the prior art. Several of these advantages are manifested by the cooperation of the plunger tube and the tubular insert whereby said plunger tube can be either partially or completely withdrawn from the test tube. An advantage of the adaptation which allows partial withdrawal is that the operator can prevent contamination of the already filtered and collected fluid with cells which may have been inadvertently drawn through the filter element. The channel in the elongated tubular insert provides a time delay from passage through the filter element to within said tubular insert of sufficient length to enable the operator to prevent any such contamination by partial withdrawal of the plunger tube. This advantage is not present in several commercially available devices which do not have the tubular insert of the present invention.

An advantage of the adaptation which allows either partial or complete withdrawal of the plunger tube of the present device is that the filtered and collected fluid will not be drawn back into unfiltered material by differential pressure as the plunger tube is withdrawn such as occurs with several commercially available devices which do not have the tubular insert of the present invention. The tubular insert excludes the possibility of migration of residual material through the filter and into the already filtered and collected fluid by interchange since there is no interface of these two components once fluid is collected in the tubular insert.

The molded-in channel of the tubular insert of the present device has the additional advantage of providing a convenient fluid collection means without the need for using a separate capillary tube as is used in a commercially available device or for pouring into a separate collection tube as required with certain other commercially available devices.

While particular embodiments of the invention have been illustrated and described herein, it will be obvious to those having skill in the art that various changes and modifications can be made without departing from the spirit and scope of the invention, and it is intended to cover in the appended claims all such changes and modifications.

What is claimed is:

1. A filter skimming device comprising an elongated plunger assembly, said assembly comprising an elongated outer plunger tube, an elongated tubular insert and a cylindrical filter element disposed therebetween, said plunger tube having a peripheral rim adapted for slidable sealing engagement of the inner walls of a test tube, a downwardly extending small bore probe and a projection on its inner bottom upon which said filter element is seated, said tubular insert being shorter in length than said plunger tube, being adapted to be inserted in snug relationship therewith and having a channel in its outer wall extending substantially throughout its entire length whereby a tubelike capillary space is formed between the outer wall of said tubular insert and the inner wall of said plunger tube, said tubular insert further having a projection on its outer bottom adapted for seating on said filter element, said channel terminating at a wall near the top and communicating with the interior of said tubular insert by a small bore opening transverse to said channel.

2. The filter skimming device of claim 1 in which the probe is offset from the center of the bottom of said plunger tube.

3. The filter skimming device of claim 1 in which said plunger tube has a peripheral rim at the top and graduations on its outer wall.

* * * * *